US011942230B2

(12) United States Patent
Choi et al.

(10) Patent No.: US 11,942,230 B2
(45) Date of Patent: Mar. 26, 2024

(54) SPACER GRID USING TUBULAR CELLS

(71) Applicant: Westinghouse Electric Company LLC, Cranberry Township, PA (US)

(72) Inventors: Joonhyung Choi, Bellevue, WA (US); Zeses Karoutas, Lexington, SC (US); Paul M. Evans, Chapin, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 61 days.

(21) Appl. No.: 17/031,098

(22) Filed: Sep. 24, 2020

(65) Prior Publication Data

US 2021/0098140 A1 Apr. 1, 2021

Related U.S. Application Data (62) Division of application No. 15/475,186, filed on Mar. 31, 2017, now Pat. No. 10,818,402.

(51) Int. Cl.
*G21C 3/356* (2006.01)
*G21C 3/344* (2006.01)
*G21C 3/322* (2006.01)

(52) U.S. Cl.
CPC .......... *G21C 3/3563* (2013.01); *G21C 3/344* (2013.01); *G21C 3/356* (2013.01); *G21C 3/322* (2013.01); *Y02E 30/30* (2013.01)

(58) Field of Classification Search
CPC ...... G21C 3/3563; G21C 3/356; G21C 3/344; G21C 3/322
USPC .......................................................... 376/442
See application file for complete search history.

(56) References Cited

U.S. PATENT DOCUMENTS

| 3,301,764 | A | * | 1/1967 | Timbs | G21C 3/324 |
| | | | | | 376/442 |
| 3,379,618 | A | | 4/1968 | Frisch | |
| 3,674,637 | A | | 7/1972 | Delafosse et al. | |
| 3,966,550 | A | * | 6/1976 | Foulds | G21C 3/3566 |
| | | | | | 376/442 |
| 4,175,003 | A | * | 11/1979 | Beuchel | G21C 3/3563 |
| | | | | | 376/442 |

(Continued)

FOREIGN PATENT DOCUMENTS

| DE | 10002824 A1 | 9/2001 |
| WO | 2015039636 A1 | 3/2015 |

OTHER PUBLICATIONS

Yueh, Silicon carbide composite for light water reactor fuel assembly applications, Journal of Nuclear Materials (2014), 448(1-3):380-388.

(Continued)

*Primary Examiner* — Jack W Keith
*Assistant Examiner* — Daniel Wasil
(74) *Attorney, Agent, or Firm* — K&L Gates LLP (57) ABSTRACT

A spacer grid specifically designed for accident tolerant fuel utilizing fuel rods with SiC cladding for implementation in pressurized water reactors. The spacer grid design allows for ease of SiC fuel rod insertion during the fuel assembly fabrication process by providing a smooth contact geometry. The co-planar support allows the fuel rods to be rotated axially more freely at the grid location than a conventional six-point contact geometry used in existing fuel assembly designs. The fuel rod support cells are attached at their corners which are shared between adjacent support cells.

10 Claims, 7 Drawing Sheets

(56) References Cited

U.S. PATENT DOCUMENTS

| | | | |
|---|---|---|---|
| 4,474,730 A * | 10/1984 | Hellman | G21C 3/3563 376/442 |
| 4,707,330 A | 11/1987 | Ferrari | |
| 4,710,343 A | 12/1987 | Christiansen et al. | |
| 4,726,926 A | 2/1988 | Patterson et al. | |
| 5,434,896 A | 7/1995 | Bryan et al. | |
| 5,666,389 A | 9/1997 | Andersson et al. | |
| 6,310,931 B1 | 10/2001 | Gustafsson et al. | |
| 6,393,087 B1 | 5/2002 | Oh et al. | |
| 2003/0007590 A1* | 1/2003 | Smith | G21C 3/34 376/442 |
| 2006/0045232 A1 | 3/2006 | Edsinger | |
| 2006/0153327 A1 | 7/2006 | Jiang | |
| 2008/0267339 A1* | 10/2008 | Helmersson | G21C 3/34 376/438 |
| 2010/0014624 A1 | 1/2010 | Lutz et al. | |
| 2010/0027734 A1 | 2/2010 | Kim et al. | |
| 2010/0322371 A1 | 12/2010 | Jiang | |
| 2011/0033020 A1 | 2/2011 | Jiang | |
| 2013/0177127 A1 | 7/2013 | Jiang | |
| 2014/0072091 A1 | 3/2014 | Liebler et al. | |
| 2015/0098546 A1 | 4/2015 | Xu et al. | |
| 2015/0287481 A1 | 10/2015 | Peucker et al. | |
| 2016/0232991 A1 | 8/2016 | Skoda et al. | |
| 2018/0286524 A1 | 10/2018 | Choi et al. | |

OTHER PUBLICATIONS

Preliminary Search Report and Written Opinion for correspondence France Application No. 1852787, dated Mar. 2, 2020.

* cited by examiner

SPACER GRID USING TUBULAR CELLS

CROSS-REFERENCE TO RELATED APPLICATIONS

This application is a divisional application claiming priority under 35 U.S.C. § 120 to U.S. patent application Ser. No. 15/475,186, entitled SPACER GRID USING TUBULAR CELLS WITH MIXING VANES, the entire disclosure of which is hereby incorporated by reference herein.

BACKGROUND

1. Field

This invention pertains generally to nuclear fuel assemblies and, more specifically, to nuclear fuel assemblies that employ fuel rods with ceramic claddings.

2. Related Art

A typical nuclear power reactor includes a reactor vessel housing a nuclear reactor core. Spaced radially, inwardly from the reactor vessel within the interior of the vessel is a generally cylindrical core barrel and within the barrel is a former and a baffle system (hereafter called the "baffle structure"), which permits transition from the cylindrical barrel to a squared-off periphery of the reactor core formed by the fuel assemblies arrayed therein.

The reactor core is composed of a large number of elongated fuel assemblies. Each fuel assembly includes a plurality of fuel rods containing the fissile material, which reacts to produce heat. The fuel rods of each fuel assembly are held in an organized, spaced array by a plurality of grids, spaced axially along the fuel assembly length and attached to a plurality of elongated control rod guide thimbles of the fuel assembly.

During operation of the reactor, a coolant fluid such as water is typically pumped into the reactor vessel through a plurality of inlet nozzles. The coolant fluid passes downward through an annular region defined between the reactor vessel and the core barrel, turns in a lower plenum defined in the reactor vessel, then passes upwardly through the fuel assemblies of the reactor core, and exits from the vessel through a plurality of outlet nozzles extending through the core barrel. Heat energy, which the fuel rods of the fuel assemblies impart to the coolant fluid, is carried off by the fluid from the vessel. Due to the existence of holes in the core barrel, coolant fluid is also present between the barrel and a baffle structure and at a higher pressure than within the core. However the baffle structure, together with the core barrel, do separate the coolant fluid from the fuel assemblies as the fluid flows downwardly through the annular region between the reactor vessel and core barrel.

Also, the power within the core is limited by the hottest temperature that can be endured by the fuel assembly components without failure. Traditionally, that limiting temperature is the temperature of the fuel rod zirconium cladding in the fuel rod experiencing the hottest temperature within the core. To promote lateral mixing of the coolant within the core to achieve a more radially uniform temperature the fuel assemblies typically employ mixing vanes that also tend to induce lateral movement of the coolant that could also result in vibration of the fuel rods if unrestrained. Typically, springs and dimples are employed in conventional grid structures within the fuel assemblies, to provide a six point contact arrangement between the fuel rods and grid structure in which the springs bias the fuel rods against a pair of dimples, with the springs and dimples extending from opposing walls of fuel rod support cells of the grids. The grids are usually axially spaced in tandem along the fuel assemblies to maintain lateral spacing between the fuel rods, through which the coolant flows. The lateral flow of coolant achieves a more uniform radial temperature distribution in the core and allows for a higher power output than could be obtained without the cross-flow of coolant, however, the power output is still limited by the highest temperature experienced by the fuel rods' zirconium cladding.

Figure 1:
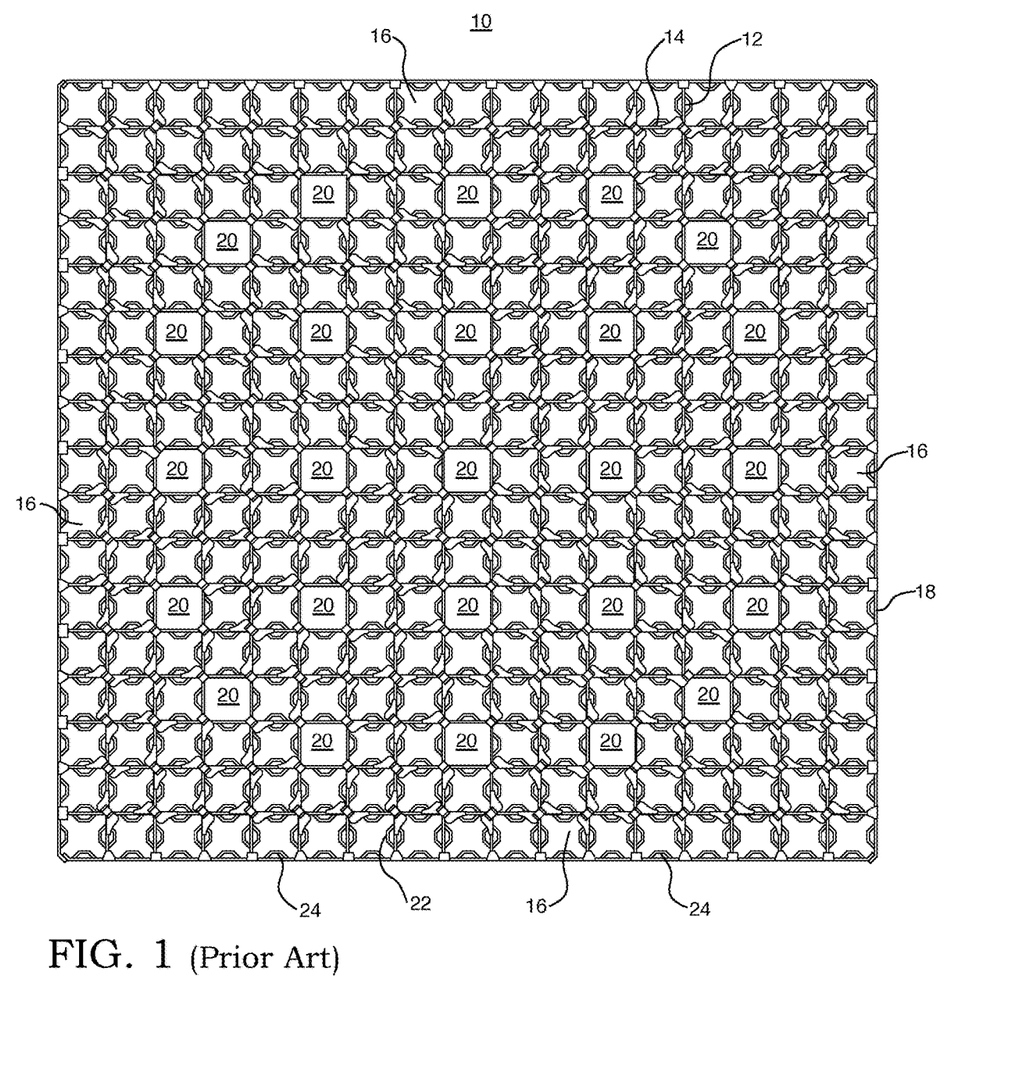
FIG. 1 is a top plan view of a pressurized water reactor conventional fuel assembly grid.
Figure 3:
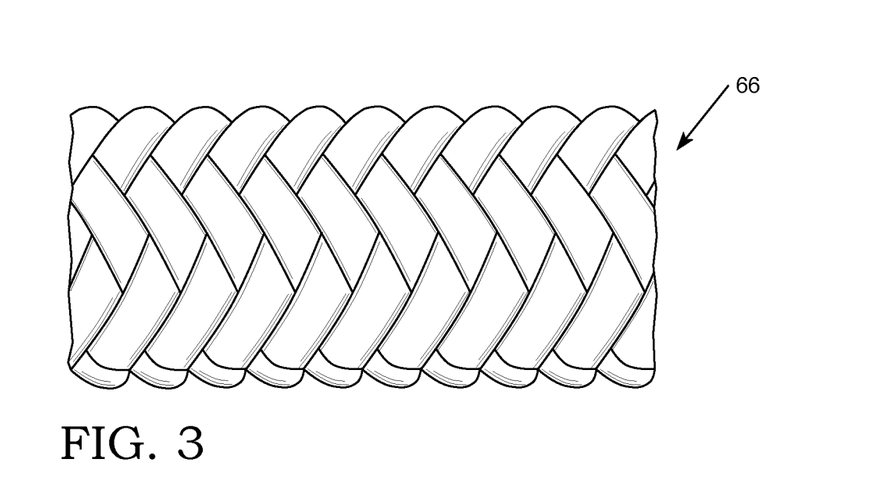
FIG. 3 is a perspective view of SiC fuel rod cladding.

More recently, SiC cladding has been proposed for the fuel rods, because the SiC cladding can withstand a much higher temperature than zirconium. In one embodiment, the SiC is formed in a braded structure to accommodate some flexibility and avoid the conventional rigidity of ceramics. Since the SiC fuel rods typically have very rough surfaces as shown by reference character 66 in FIG. 3, it is likely that the current grid designs illustrated in FIG. 1, which employ grid spring/dimple features for holding the fuel rods within the fuel assembly, could be damaged during insertion into the fuel skeleton. The potential for damage is especially a cause for concern for the horizontal dimple design which is typically used in most pressurized water reactor grids. In the case of the horizontal dimple design, the rough surface of the SiC cladding could hang-up on the dimple and damage the dimple, or it could damage the SiC fuel rod cladding. Therefore, the current six-point (two springs and four dimples) grid design may not be appropriate for use with SiC fuel cladding. Accordingly, a new fuel assembly grid design is desired that is specifically suitable for SiC clad nuclear fuel.

SUMMARY

The invention contemplates a nuclear fuel assembly spacer grid having an axial dimension along the vertical axis of an elongated fuel assembly in which it is to be deployed. The nuclear fuel assembly grid comprises a plurality of tubular fuel rod support cells having four walls, generally square in cross section. The walls have a length along the axial dimension that is longer than a width of the walls and substantially flat corners that connect on an interior of the spacer grid with adjacent fuel rod support cells or a control rod support cell, with an interior of each of the walls supporting a vertical spring. The invention also contemplates a mixing vane connected to an exterior of at least one of the fuel rod support cells in an area between fuel rod support cells.

In one embodiment each of the fuel rod support cell walls are bowed inwardly, preferably around an axis parallel to the vertical axis, into an interior of the fuel rod support cell. Preferably, the vertical spring is formed from two vertical slits in the center of each of the walls of the fuel rod support cells.

In still another embodiment the corners between connected adjacent fuel rod support cells are integral to both adjacent support cells. Preferably, the integral corners are not substantially thicker than 0.018 inch (0.046 cm).

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Many conventional spacer grids are composed of straight grid straps that are interleaved together to form an egg-crate configuration having a plurality of roughly square cells, many of which support fuel rods. An example of such a conventional fuel grid 10 can be found in FIG. 1. A spaced, parallel array of grid straps 12 of equal length are positioned orthogonally to a second plurality of the spaced, parallel grid straps 14 of equal length and are encircled by a border strap 18, with each of the straps being welded at their intersections. The cells 16 support the fuel rods while the cells 20 support guide tubes and an instrumentation tube. Because the fuel rods must maintain a spacing or pitch between each other, these straight grid straps 12 and 14 at the locations that border the cells 16 that support the fuel rods have springs 22 and/or dimples 24 that are stamped in the sides of the straps 12 and 14 to protrude into the cells 16 to contact the fuel rods and hold them firmly in position. The stamped features on the grid straps 12 and 14, i.e., the springs 22 and the dimples 24, require careful design and precise manufacturing to assure adequate force is maintained to secure the fuel rods when considered in combination with the other grids in the tandem array of grids along the fuel assembly.

Figure 2:
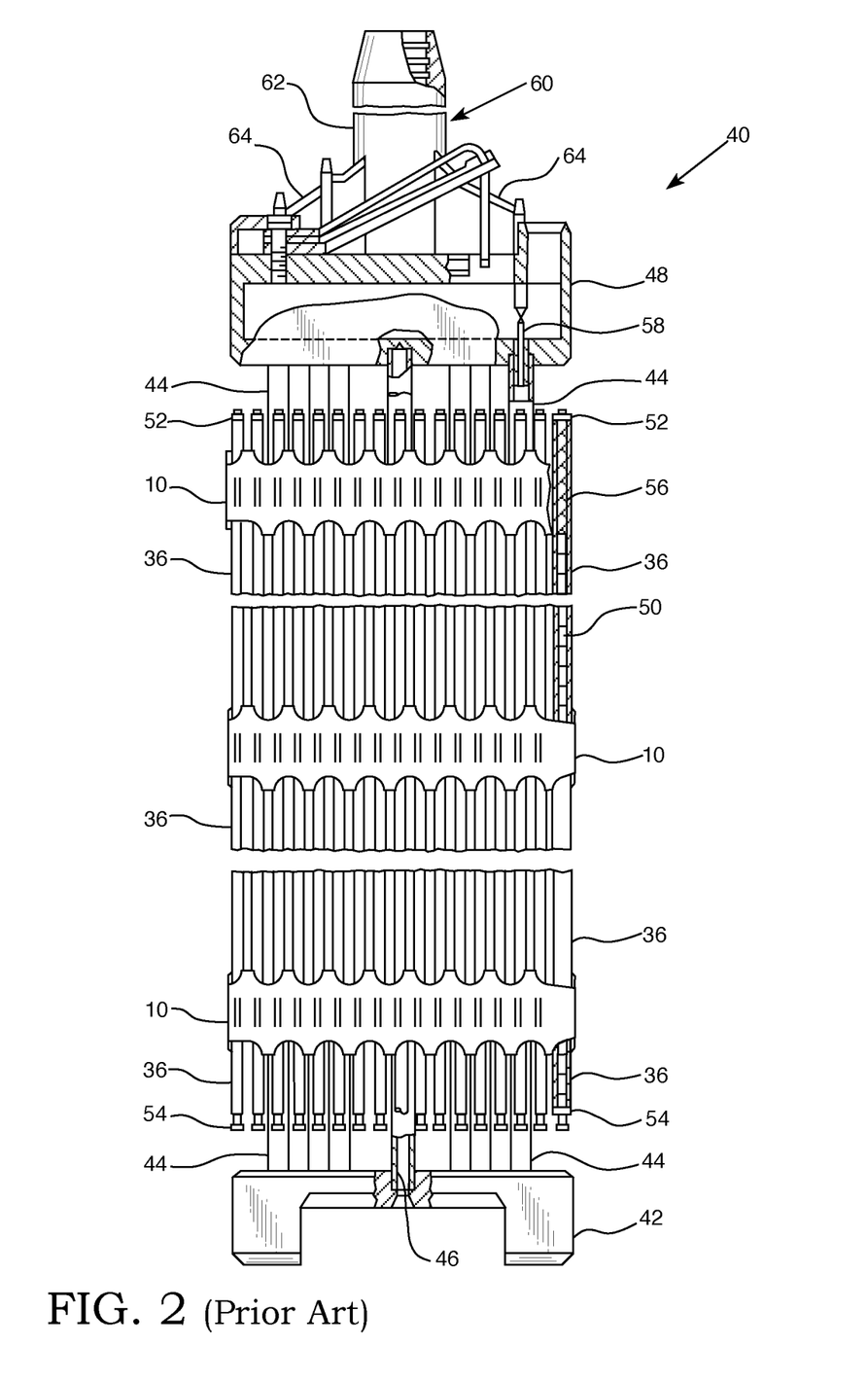
FIG. 2 is an elevational view, partially in section, of a conventional fuel assembly; the assembly being illustrated in vertically foreshortened form with parts broken away for clarity.

Referring to FIG. 2, there is shown an elevational view of a conventional fuel assembly represented in vertically foreshortened form and being generally designated by reference character 40. The fuel assembly 40 is of the type used in a pressurized water reactor and basically includes a lower end structure or bottom nozzle 42 for supporting the fuel assembly on a lower core plate (not shown) in the reactor core region and a number of longitudinally extending guide thimbles or tubes 44 which project upwardly from the bottom nozzle 42. The assembly 40 further includes a plurality of the transverse grids 10, shown in FIG. 1. This invention replaces the fuel rod support cells 16 shown in FIG. 1 with the tubular fuel rod support cells 26 shown in FIGS. 4 and 5. The grids 10 are axially spaced along and supported by the guide thimbles 44. The grids 10 supported in a spaced tandem array by the control rod guide thimbles 20 and coupled at their lower ends to the bottom nozzle 42 is generally referred to as the fuel assembly skeleton. Assembly 40 also includes a plurality of elongated fuel rods 36 transversely spaced and supported in an organized array by the grids 10. Also, the assembly 40 has an instrumentation tube 46 located in the center thereof and an upper end structure or nozzle 48 attached to the upper ends of the guide thimbles 44. With such an arrangement of parts, the fuel assembly 40 forms an integral unit capable of being conveniently handled without damaging the assembly of parts.

As mentioned above, the fuel rods 36 and the array thereof in the assembly 40 are held in spaced relationship with one another by the grids 10 spaced along the fuel assembly length. Each fuel rod 36 includes nuclear fuel pellets 50 and the opposite ends of the rods 36 are enclosed by upper and lower end plugs 52 and 54, to hermetically seal the rod. Commonly, a plenum spring 56 is disposed between the upper end plug 52 and the pellets 50 to maintain the pellets in a tight, stacked relationship within the rod 36. The fuel pellets 50 composed of fissile material are responsible for creating the reactive power of the PWR. A liquid moderator/coolant, such as water or water-containing boron, is pumped upwardly through the fuel assemblies of the core in order to extract heat generated therein for the production of useful work.

To control the fission process, a number of control rods 58 are reciprocally movable in the guide thimbles 44 located at predetermined positions in the fuel assembly 40. Specifically, the top nozzle 48 has associated therewith a rod cluster control mechanism 60, having an internally threaded cylindrical member 62 with a plurality of radially extending flukes or arms 64 such that the control mechanism 60 is operable to move the control rods 58 vertically in the guide thimbles 44 to thereby control the fission process in the fuel assembly 40, all in a well-known manner.

Figure 4:
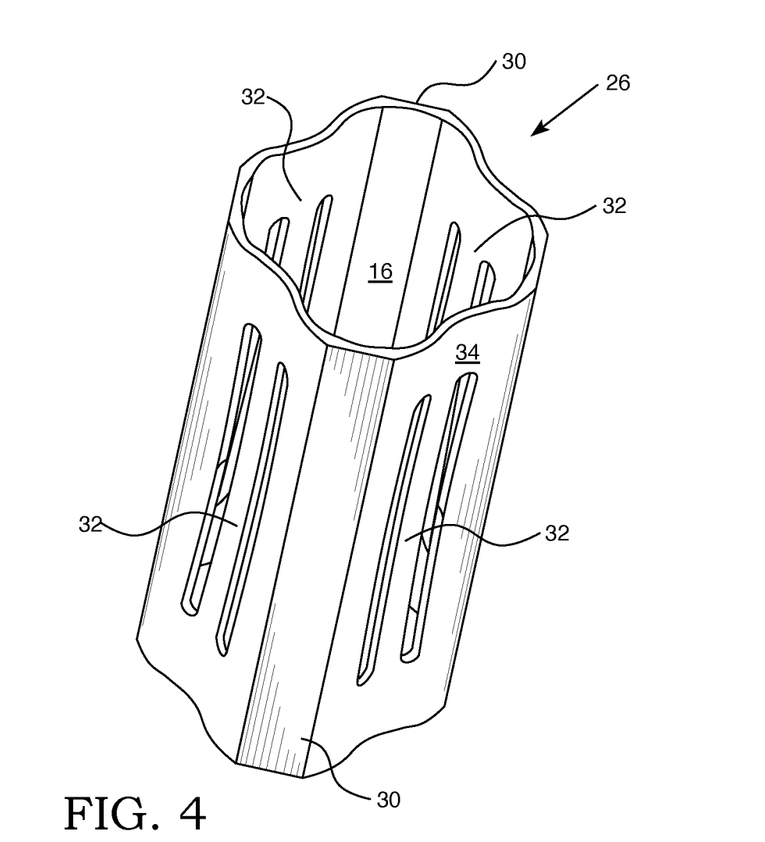
FIG. 4 is a perspective schematic view of one fuel rod tubular support cell of one embodiment of this invention.
Figure 5:
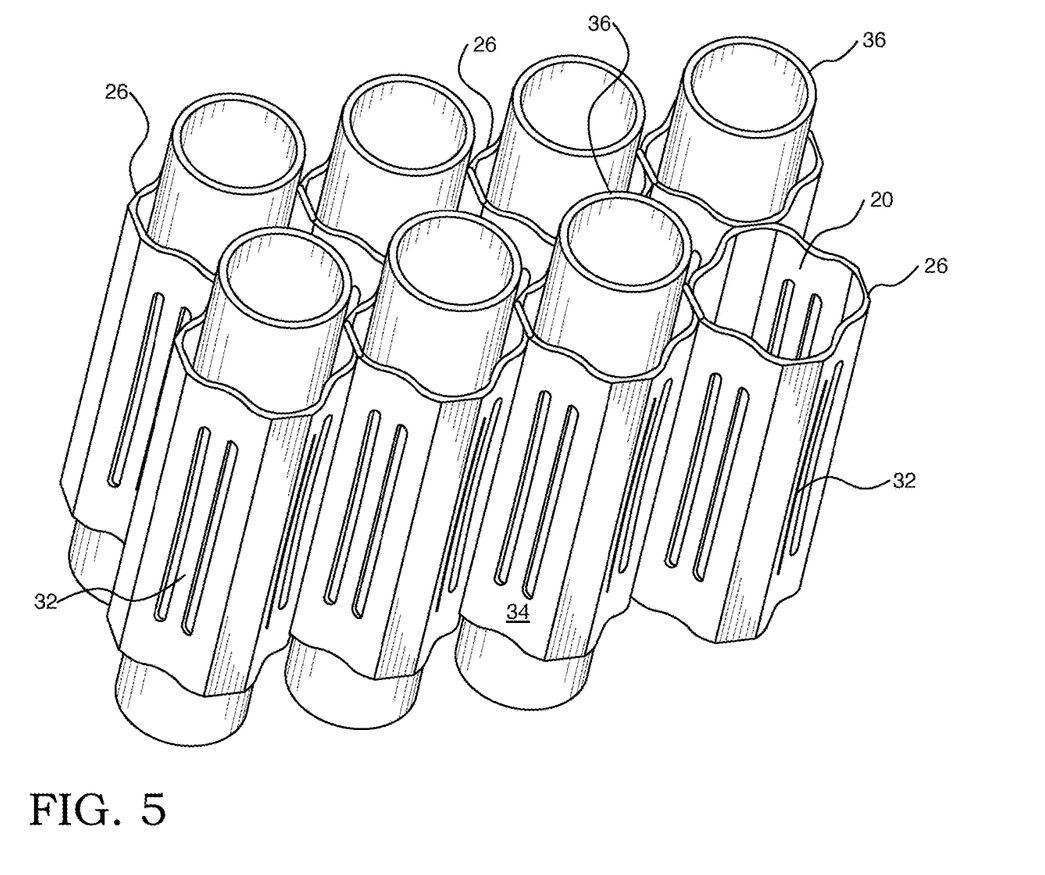
FIG. 5 is a perspective schematic view of a plurality of the fuel rod tubular support cells shown in FIG. 4, attached at their corner with portions of the fuel rod cladding supported within the cells.
Figure 6:
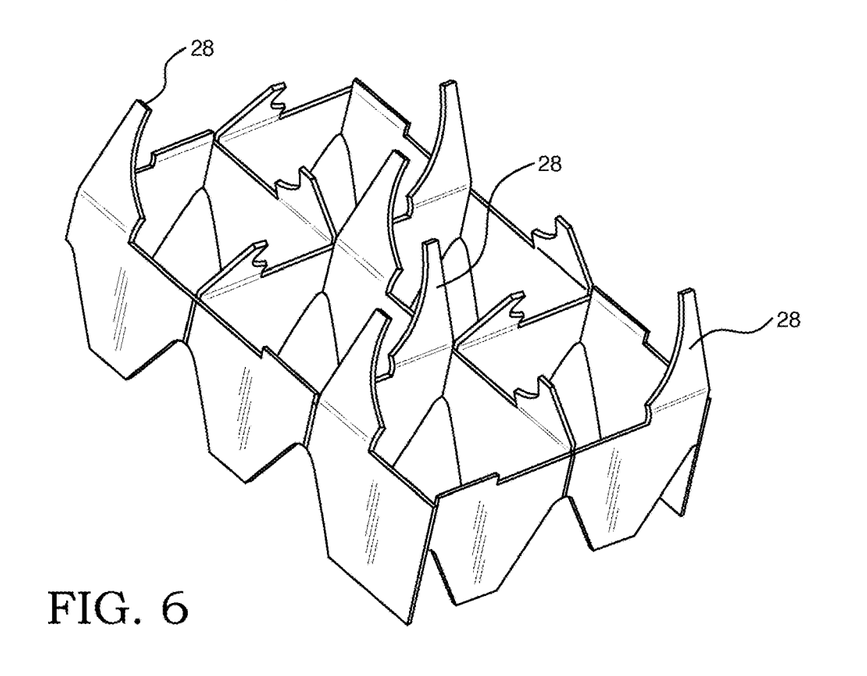
FIG. 6 is a perspective of one embodiment of a mixing vane configuration that can be employed with this invention.

As shown in FIGS. 4 and 5, one preferred embodiment of the spacer grid 10 of this invention comprises a plurality of tubular cells 26 with mixing vanes 28 (shown in FIGS. 7, 8 and 9) with the cells attached together at their corners 30 with the corners preferably formed from flat vertical strip of the strap that surrounds the fuel rod support cells 16. The tubular cell 26 shown in FIG. 3 has four vertical springs 32, one in the center of each cell wall 34 to prevent spring damages during fuel rod insertion. Also, the co-planar springs 32 will not prevent fuel rod local rotation such that it could otherwise cause fuel rod breakage due to fuel rod bowing. In one embodiment, the surface of the vertical springs is coated with a hard material at least as hard or harder than the SiC, cladding, such as the Diamond-Like Coating available from Techmetals, Dayton Ohio, or other similar material, to prevent the rough SiC cladding from wearing down the spring. The coating may be applied by physical vapor deposition or other similar coating processes. Preferably, each wall 34 of the fuel rod support cells 16 is bowed inwardly towards the corresponding fuel rod 36, with the bend centered on a vertical axis running along the vertical spring 32. The tubular fuel rod support cells 26 take the place of the conventional six point contact support cells and in other respects the tubular support grid, e.g., the control rod support locations, can take the form of a traditional grid or replicate the tubular fuel rod support cells, with or without the vertical springs.

Figure 7:
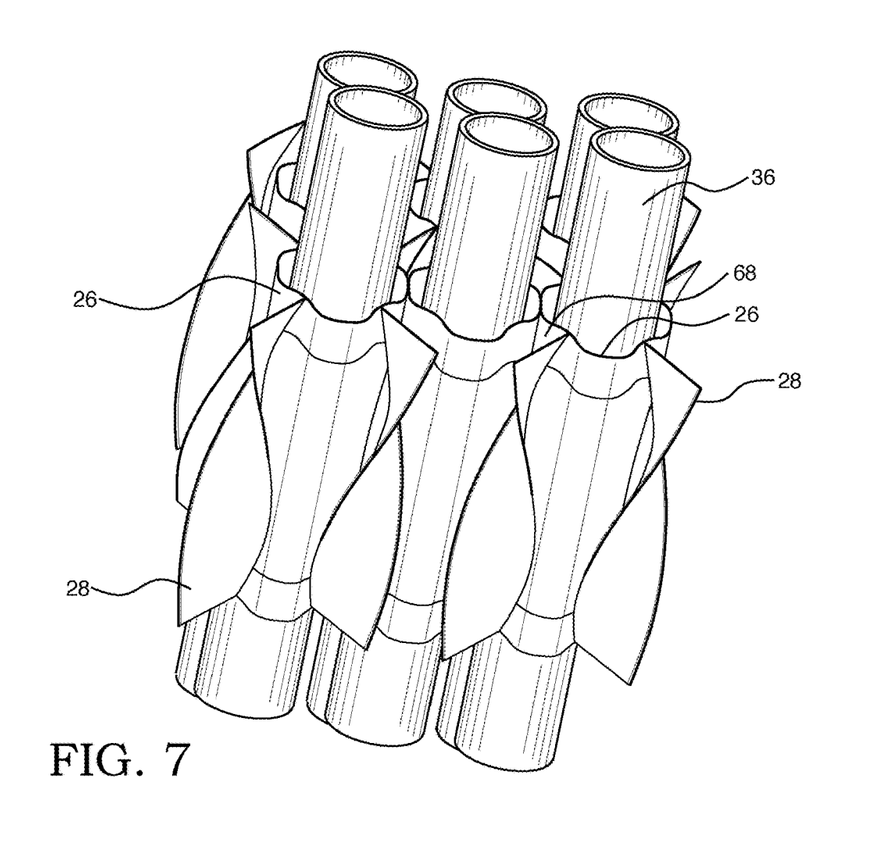
FIG. 7 is a side view of another embodiment of a mixing vane that can be employed with this invention.
Figure 8:
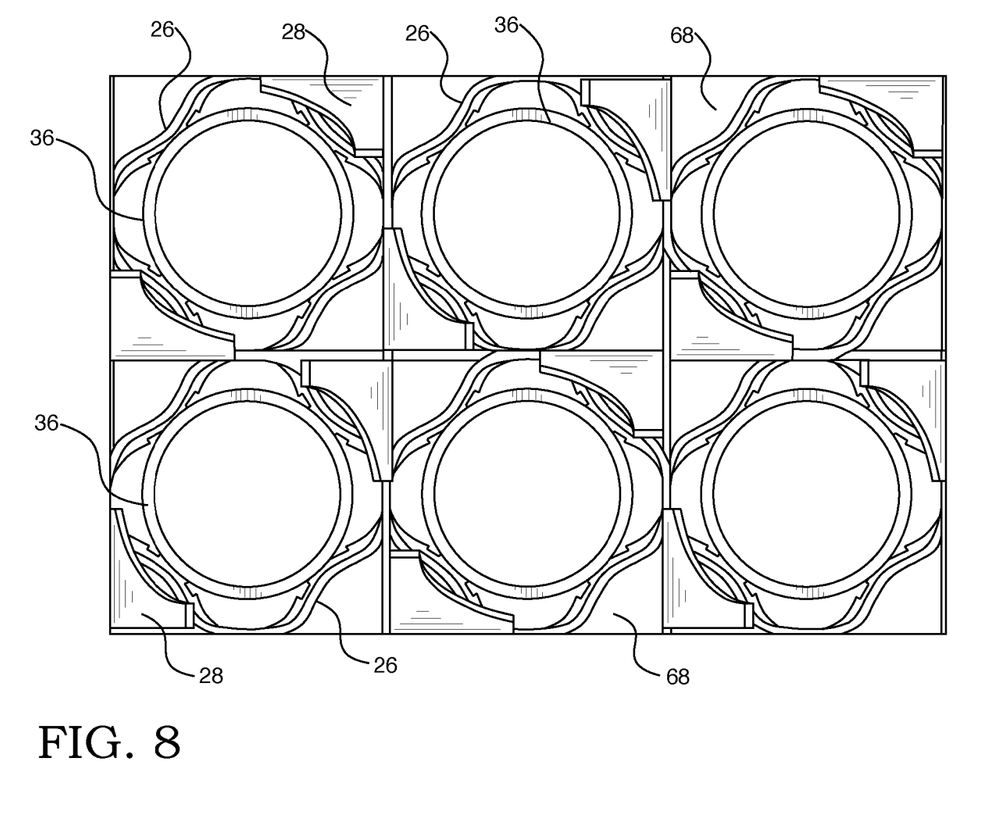
FIG. 8 is a planned view of the mixing vane of FIG. 7 installed in the tubular grid of FIG. 5.
Figure 9:
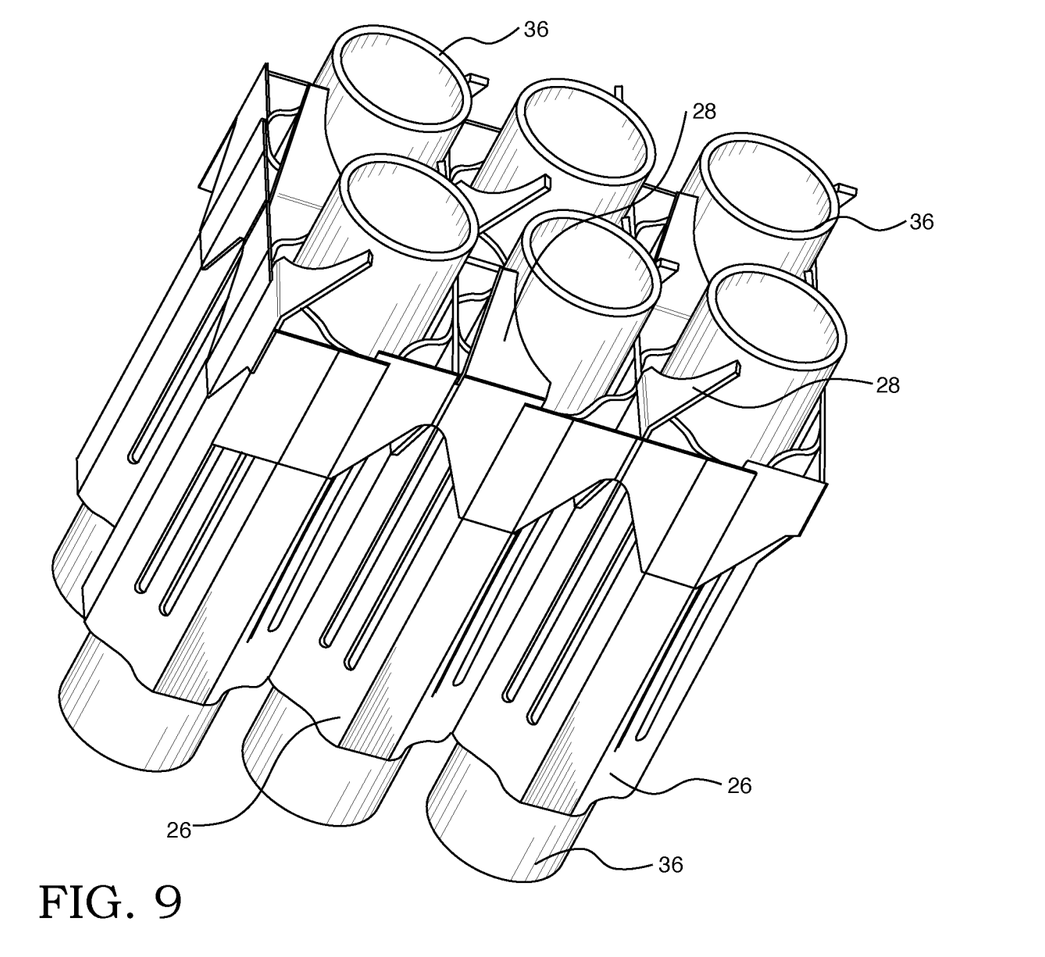
FIG. 9 is a schematic perspective view of the mixing vanes of FIG. 6 installed over the tubular grid of FIG. 5.

As an example, a typical split-mixing vane design 28 can be attached using the proposed geometry in FIG. 4. The vane will be located at the sub-channel 68 between fuel rods, i.e., the open area between the fuel rod tubular support cells 26, as shown in FIGS. 7 and 8. A chamfer may be formed under the vane to reduce pressure drop of the grid. The grid mixing vane will be integrated with the tubular cell as a single body. In addition, advanced mixing vane designs such as multiple angled vane, non-flat vane (convex or concave), or swirling vane (FIG. 7) can be additively manufactured as a single body structure. By introducing the additive manufacturing (3D printing), the proposed spacer grid can be printed without further assembling or welding processes. In addition, there will be only single thin wall (0.018 inch (0.046 cm)) between cells so that the pressure loss coefficient would be smaller than that of a typical grid design.

Accordingly, this invention provides a tubular cell design which allows for a smooth insertion of SiC type fuel rods while also resulting in a low pressure drop as compared to existing grid designs. Such an additively manufactured spacer grid design allows for 1) the implementation of highly detailed yet fully integrated mixing features enhancing thermal and hydraulic performance, 2) minimizing the overall pressure drop (single wall) and 3) increasing overall grid strength for seismic concerns.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear fuel assembly spacer grid comprising:
   a plurality of tubular support cells having four walls and four substantially flat corners, wherein one of the flat corners is positioned between two of the walls, wherein at least a first pair of adjacent flat corners of adjacent support cells form a single integral corner between the adjacent support cells, wherein the single integral corner is a unitary one-piece corner that is shared between the first pair of the adjacent corners of the adjacent support cells, and wherein the unitary one-piece corner is a part of each of the adjacent support cells;
   a spring supported from each of the four walls of each of the support cells that extends at least partially into the support cell, with the spring having a contact surface that contacts a fuel rod when the fuel rod is loaded in the support cell; and
   a hard material coating on the contact surface that is as hard as or harder than SiC.

2. The nuclear fuel assembly spacer grid of claim 1, wherein each unitary one-piece corner is not thicker than 0.018 inch.

3. The nuclear fuel assembly spacer grid of claim 1, wherein the hard material coating is deposited by physical vapor deposition.

4. A nuclear fuel assembly comprising:
   the nuclear fuel assembly spacer grid of claim 1:
   a fuel rod comprising a SiC coating and the fuel rod received within one of the support cells.

5. The nuclear fuel assembly spacer grid of claim 1, wherein each of the four walls is bowed inwardly thereby forming a bend.

6. The nuclear fuel assembly spacer grid of claim 5, wherein each bend is centered on an axis running along each respective spring.

7. The nuclear fuel assembly spacer grid of claim 1, wherein each spring is positioned in a center of one of the walls.

8. The nuclear fuel assembly spacer grid of claim 1, wherein the nuclear fuel assembly spacer grid is not welded.

9. The nuclear fuel assembly spacer grid of claim 1, wherein the nuclear fuel assembly spacer grid is produced by additive manufacturing.

10. The nuclear fuel assembly spacer grid of claim 1, wherein each spring is formed from two slits in one of the walls.

* * * * *